No. 706,170. Patented Aug. 5, 1902.
H. FELDMEIER.
APPARATUS FOR HEATING OR COOLING LIQUIDS.
(Application filed Mar. 14, 1901.)

(No Model.) 4 Sheets—Sheet 1.

Witnesses: H. Feldmeier, Inventor.

No. 706,170. Patented Aug. 5, 1902.
H. FELDMEIER.
APPARATUS FOR HEATING OR COOLING LIQUIDS.
(Application filed Mar. 14, 1901.)
(No Model.) 4 Sheets—Sheet 2.
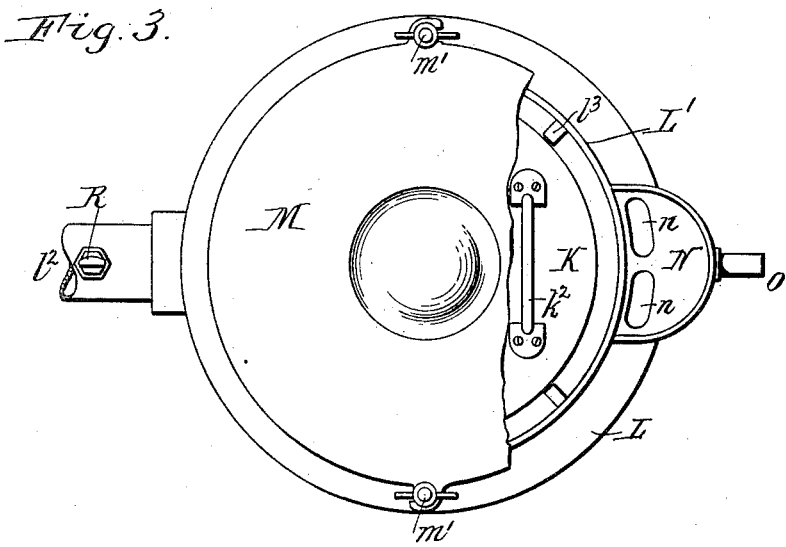
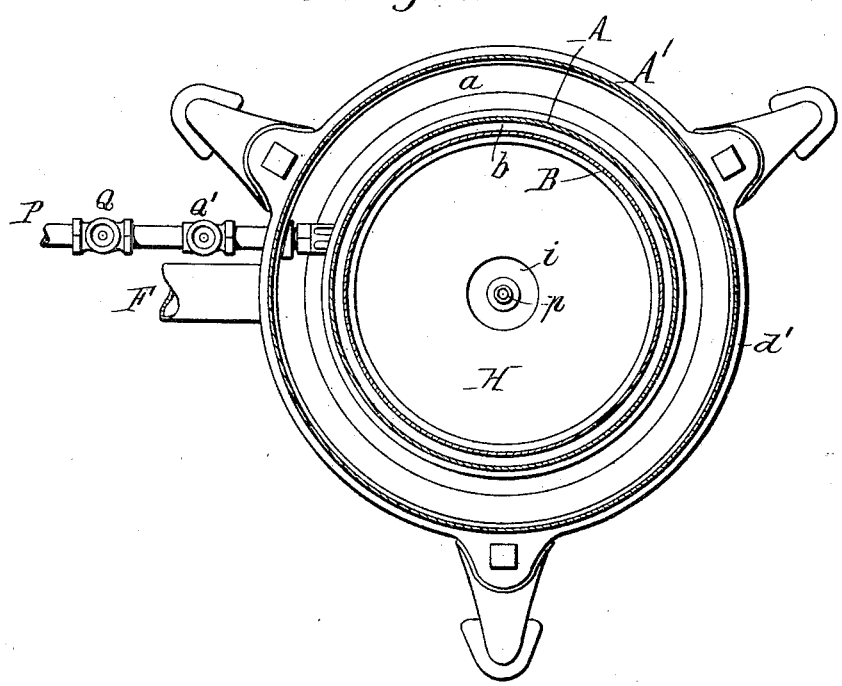
Witnesses:
F. F. Sebeyaiger
Henry L. Deck
Harvey Feldmeier Inventor.
By Wilhelm Bonner
Attorneys.

No. 706,170. Patented Aug. 5, 1902.
H. FELDMEIER.
APPARATUS FOR HEATING OR COOLING LIQUIDS.
(Application filed Mar. 14, 1901.)
(No Model.) 4 Sheets—Sheet 3.
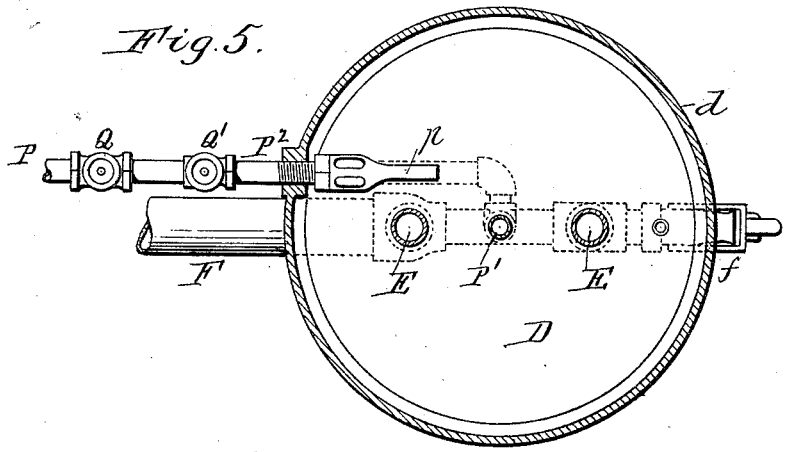
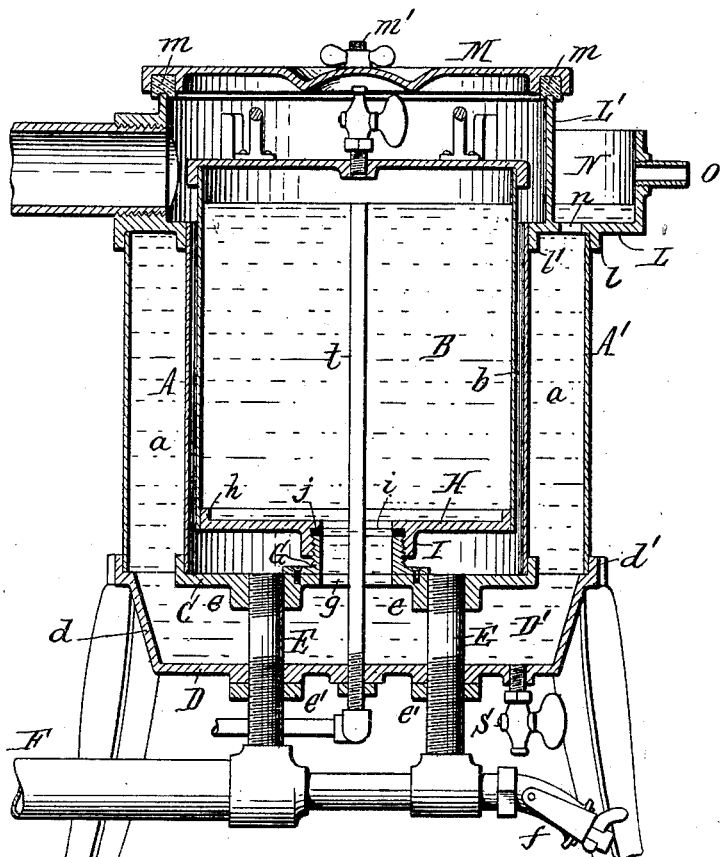

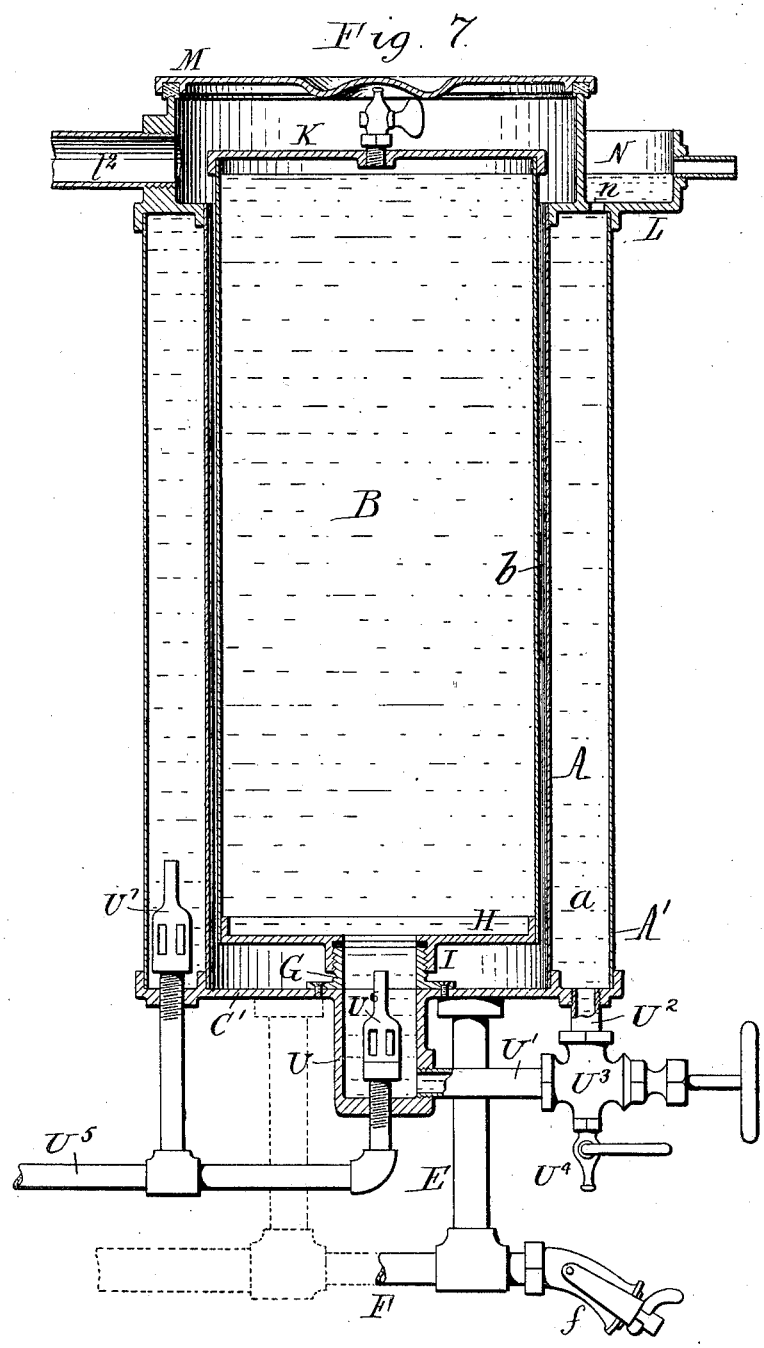

UNITED STATES PATENT OFFICE.

HARVEY FELDMEIER, OF LITTLEFALLS, NEW YORK, ASSIGNOR TO D. H. BURRELL & COMPANY, OF LITTLEFALLS, NEW YORK.

APPARATUS FOR HEATING OR COOLING LIQUIDS.

SPECIFICATION forming part of Letters Patent No. 706,170, dated August 5, 1902.

Application filed March 14, 1901. Serial No. 51,181. (No model.)

*To all whom it may concern:*

Be it known that I, HARVEY FELDMEIER, a citizen of the United States, and a resident of Littlefalls, in the county of Herkimer and State of New York, have invented new and useful Improvements in Apparatus for Heating or Cooling Liquids, of which the following is a specification.

This invention relates to an apparatus which is designed mainly for heating milk; but which may be also used for heating other liquids or for pasteurizing milk and other liquids and which by slight changes may be made available for cooling liquids.

For the sake of brevity I will explain my invention mainly as embodied in an apparatus for heating milk while flowing from a reservoir or vat to a centrifugal creamer. The apparatus is of that general type in which a narrow annular flow-space is formed between a jacketed outer case or cylinder and a hollow internal core. The milk flows through this annular space, entering at one end and escaping at the other, and is acted upon by the heating or cooling medium, which is applied both to the inclosing jacket or case and the internal core, so that the thin layer of milk flowing through the annular space is acted upon on both sides, and thereby quickly and uniformly heated or cooled.

The objects of my invention are mainly to produce an apparatus of this general character in which the hollow core can be readily removed for cleaning or other purposes without disturbing the pipes by which the milk is supplied to the flow-space and the steam or other heating medium is supplied to the jacket and core and in which the inlet and outlet devices of the flow-space are so constructed that the milk can be conducted to the flow-space and discharged therefrom under pressure, whereby the flow of the milk from the heater to the centrifugal separator is nicely controlled.

Figure 1:
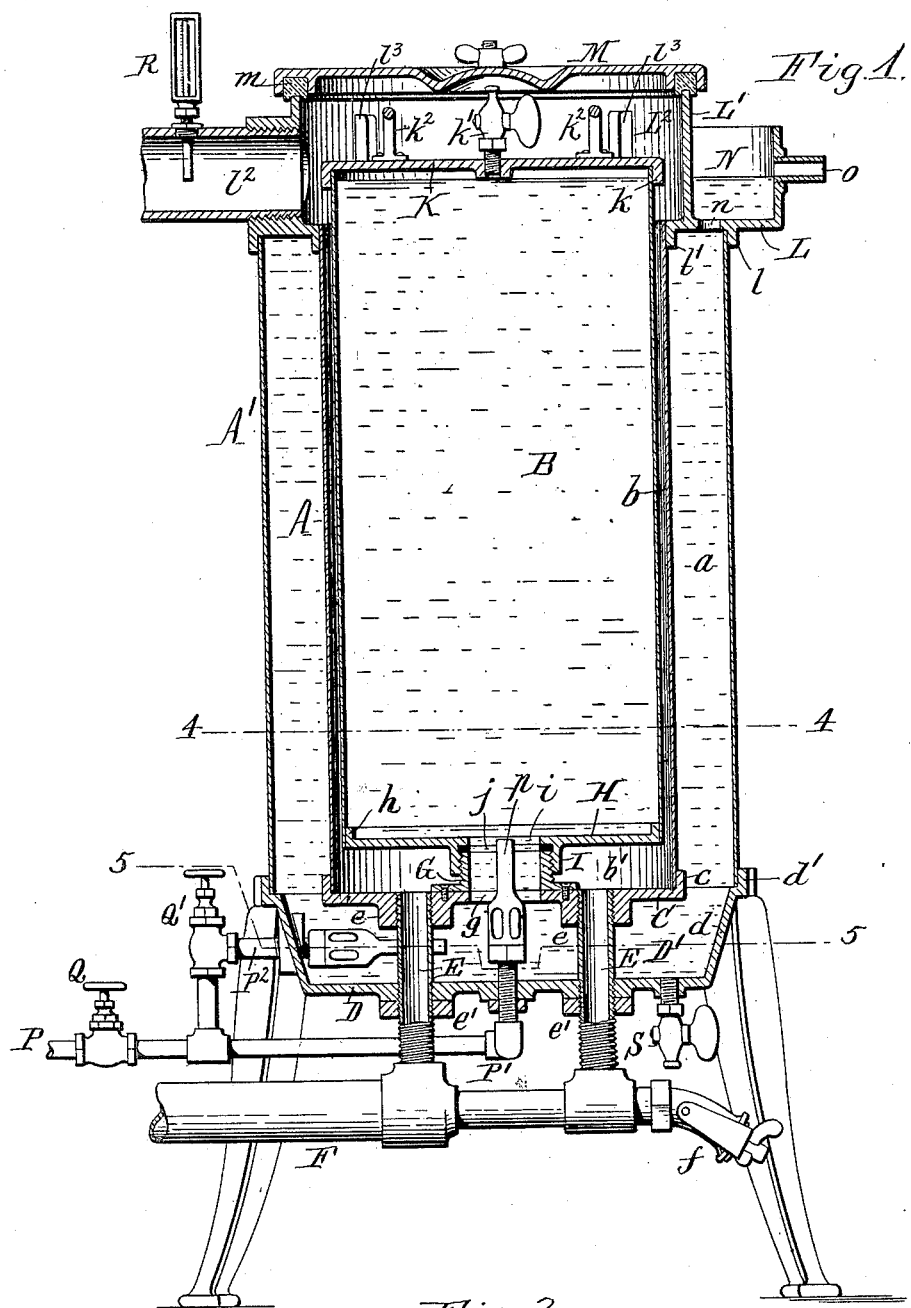
Figure 2:
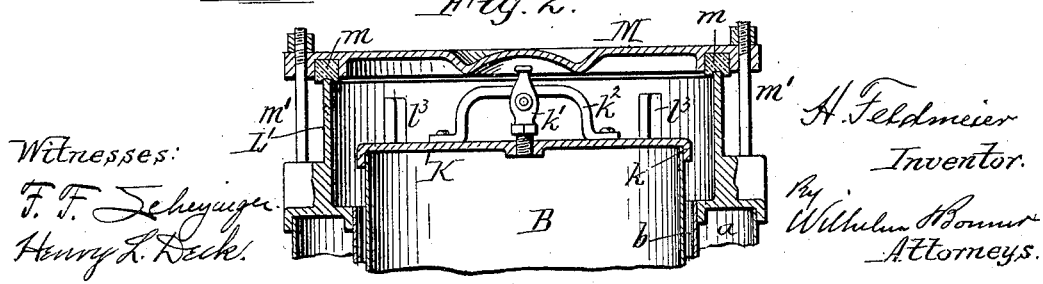

In the accompanying drawings, consisting of four sheets, Figure 1 is a vertical section of my improved apparatus. Fig. 2 is a similar section of the upper portion thereof at right angles to Fig. 1. Fig. 3 is a top plan view thereof. Figs. 4 and 5 are horizontal sections in lines 4 4 and 5 5, Fig. 1, respectively. Fig. 6 is a vertical section, on a reduced scale, showing the apparatus slightly modified, so as to be available as a cooler. Fig. 7 is a vertical section illustrating another modified construction of the apparatus.

Like letters of reference refer to like parts in the several figures.

In Figs. 1 to 5, A represents an upright vessel provided with a jacket A', which forms a water-space $a$ around the vessel. B is the internal hollow core, corresponding in form with that of the vessel A and made slightly smaller in diameter or horizontal dimension, so as to leave a narrow annular flow-space $b$ between the inclosing vessel A and the core B. The upright vessel A and core B are preferably cylindrical in shape, but other forms may be employed.

The vessel or cylinder A is secured at its lower end to a horizontal bottom or head C, which is provided with an upturned marginal flange $c$ for that purpose. The jacket A' is secured at its lower end to a bottom or head D, which is provided with an outer wall $d$, rising to the level of the inner bottom C and provided at its upper end with a marginal flange $d'$, to which the lower end of the jacket is secured. The outer bottom D is arranged so far below the inner bottom C that a capacious water-chamber D' is formed between the two. This chamber communicates between the marginal flanges $c$ and $d'$ with the water-space $a$ between the cylinder A and jacket A'.

The inner bottom C and outer bottom D are secured together by two upright pipes E, which enter the outer bottom D from below and open upwardly through the inner bottom C. The upper ends of these pipes are preferably screwed into bosses $e$, formed on the inner bottom C. These pipes are screwed into openings formed in the outer bottom D and are further secured and tightened by jam-nuts $e'$, applied to the pipes below the outer bottom. Packings may, if desired, be interposed between the nuts $e'$ and the outer bottom. The lower ends of these pipes connect with a horizontal milk-supply pipe F, which is provided at its end with a drain gate or cock $f$ of any suitable construction.

$g$ is an opening formed centrally in the inner bottom C, and G is an externally-screw-threaded collar or short tube which is secured to or formed on the inner bottom C around this opening and which projects upwardly. The two pipes E are arranged outside of this opening and collar.

H is the horizontal bottom or lower head of the internal core B. This bottom is provided with a marginal flange $h$, to which the upright wall of the core is secured, and with a central opening $i$, which is surrounded by a downwardly-projecting collar or short tube I. The latter is provided with an internal screw-thread which engages the thread of the collar G on the inner bottom C. In order to form a water-tight joint, a packing-ring $j$, of leather or other suitable material, is arranged in the collar I around the opening $i$. This packing-ring is compressed between the end of the collar G and the bottom of the collar I in screwing the core B down to its seat. When the parts are in this position, as shown in Fig. 1, an ample flow-space $b'$ is left between the inner bottom C and the lower head H of the core. This flow-space communicates with the annular flow-space $b$ between the core and the cylinder A.

K represents the upper head or top plate of the core, provided with a marginal flange $k$, to which the upper end of the upright wall of the core is secured.

$k'$ is an air vent or cock which is secured in the top plate K, and $k^2$ represents handles secured to the top plate for turning the core in screwing it down upon the collar G or unscrewing it therefrom.

When the core is connected by its collar I with the collar G of the inner bottom C, as shown in Fig. 1, the internal space of the core communicates, through these collars, with the water-chamber $D'$ between the inner head C and outer head D and the water-space $a$ of the jacket, so that all of these spaces are in direct and free communication.

L represents a horizontal annular plate or head which closes the top of the water-space $a$ between the cylinder A and jacket $A'$ and which is provided with downwardly-projecting concentric flanges $l\, l'$, to which the upper ends of the cylinder A and jacket $A'$ are secured.

$L'$ is an upright inclosing wall which rises from the plate L and extends upwardly beyond the top plate K of the core. The outlet-chamber $L^2$, formed within this wall $L'$, communicates with the upper end of the annular flow-space $b$ between the cylinder A and the core B, so that the milk or other liquid flowing upwardly through this flow-space enters the chamber $L^2$.

$l^2$ is a lateral outlet pipe or passage arranged in the upright wall $L'$ for carrying off the liquid from the chamber $L^2$. The upper end of the core is centered in the chamber $L^2$ by ribs $l^3$, formed on the inner side of the inclosing wall $L'$, as shown in Figs. 1 and 3.

M is a cover which is secured upon the upright wall $L'$ to close the chamber $L^2$ at the top. This plate is provided on its under side with an annular packing $m$, by which it bears upon the top of the upright wall $L'$, and is secured by any suitable means—for instance, by bolts $m'$.

N is an overflow box or funnel which is formed on the outer side of the upright wall $L'$ above the horizontal plate L and above the water-space $a$ between the cylinder A and the jacket $A'$, with which it communicates by one or more openings $n$, formed in the plate L.

O is an overflow-pipe which is arranged in the side of the box N about on a level with the top of the core B.

The water-space $a$ within the jacket $A'$, the lower water-chamber $D'$, and the core B are filled from this overflow-box, to which the water is supplied until these spaces are full.

P is a steam-pipe through which steam is supplied for heating the water in these spaces. This pipe terminates in two branches $P'\ P^2$. The branch $P'$ enters upwardly through the middle of the outer bottom D and delivers the steam through the collars G I to the interior of the core. The branch $P^2$ enters horizontally through the upright wall of the outer bottom D and delivers the steam to the water-space $D'$ between the inner bottom C and the outer bottom D. Each of these branches is preferably provided within the water-space with a nozzle $p$ of any suitable construction, which emits the steam without noise.

Q is a hand-valve arranged in the main steam-pipe, and $Q'$ a similar valve arranged in the branch pipe $P^2$. When the branch pipe $P'$ alone supplies the required volume of steam, the branch pipe $P^2$ can be shut off. As the water-spaces of the jacket and core communicate, the pressure is equalized in the same.

For filling the water-spaces with water the cover M is removed, the air-vent $k'$ is opened, and water is poured into the overflow-box N until the water-spaces are full. The air-vent is then closed, the cover secured in place, and the steam turned on. When the water in these spaces has been heated to the proper temperature, the milk is admitted to the milk-supply pipe F, which receives the milk from a pump or an elevated reservoir in a well-known manner. The milk flows from the pipe F upwardly through the pipes E into the space $b'$ between the inner bottom C and the bottom of the core and then upwardly through the flow-space $b$ between the core B and the cylinder A. The milk escapes from the upper end of this flow-space into the top chamber $L^2$ and escapes from the latter through the pipe $l^2$.

The milk or other liquid to be treated is supplied to the pipe F from an elevated reservoir or by a pump and is forced under pressure upwardly through the flow-space and through the outlet-chamber $L^2$ and discharge-pipe $l^2$ to the centrifugal creamer. This permits of a nice regulation of the flow of the milk to the separator. In passing through the apparatus in this manner the thin annular layer of milk is acted upon on its outer side by the heated jacketed cylinder A and on its inner side by the heated core B, whereby the milk is thoroughly and evenly heated and its temperature is quickly raised to the desired point, usually 90° Fahrenheit. This enables the milk to be forced through the apparatus at a comparatively high speed, whereby overheating of the milk and the resultant coating of the heating-surfaces by the coagulation of part of the albumen is avoided. As the heating-surfaces are comparatively large, a correspondingly low temperature can be maintained in the water-spaces.

A thermometer R is arranged in the milk-escape pipe $l^2$ for indicating the temperature of the outgoing milk.

The volume of water in the water-spaces of the apparatus increases gradually by the condensation of the steam, and this excess flows off through the overflow-box. The latter provides an outlet for this excess both from the water-jacket and the core and maintains the water-level at the proper height in both.

When it is desired to clean the apparatus, the milk and the steam are shut off. The cover M is removed, the air-vent is opened, the drain-gate $f$ of the milk-pipe is opened, and the core is unscrewed. The water now escapes from the core and other water-spaces through the pipes F and E and the drain-gate, and the small quantity of water remaining in the chamber D' between the inner bottom C and the outer bottom D is drawn off through a drain-cock S in the outer bottom.

The milk and steam pipes are connected with the apparatus below the water-jacket and the core, and the latter can therefore be removed for cleaning the parts and replaced without in any way disturbing the pipes.

The upright cylinder A and the upright wall of the core B are preferably made of tinned copper, and the heads are preferably made of cast-iron and galvanized.

The apparatus can be made available as a cooler by slight changes in its construction. For instance, as shown in Fig. 6, the cold water can be supplied to the water-space $a$ around the cylinder A by supplying it to the overflow-box, which in this case serves as a feed-box or supply-funnel, or in any other suitable way, and the warm water can be discharged from the upper portion of the core by an overflow-pipe $t$, which has its inlet in the upper portion of the core and extends downwardly through the outer bottom D. The steam-pipes are omitted in this case.

In the modified construction of the apparatus represented in Fig. 7 the capacious water-chamber at the lower end of the apparatus, with which the core and the water-jacket communicate, is replaced by a much smaller chamber, and communication is established between this chamber and the jacket in a somewhat-different manner. In this figure, C' is a head or bottom plate which takes the place of the inner bottom C in the construction hereinbefore explained and which extends to the outer shell A' and receives the lower end of the latter, as well as the lower end of the vessel A. This plate C' therefore forms the bottom of the space $a$ of the water-jacket. U is a chamber formed centrally on the under side of the plate C' in line with the collar G. U' is a pipe which is connected with the lower end of this chamber, and $U^2$ a pipe connected with the bottom of the water-jacket. Both of these pipes are connected with a stop-valve $U^3$, by which the pipe U' can be opened or closed. This valve is provided with a drip-cock $U^4$. The steam-pipe $U^5$ is provided with two branches, one of which opens by a nozzle $U^6$ in the chamber U and the other by a nozzle $U^7$ in the space $a$ of the jacket. The milk-inlet pipes E open through the bottom plate C'. When the valve $U^3$ is open, the jacket and the core are in communication through the chamber U and the pipes U' $U^2$. When it is desired to remove the core for cleaning the apparatus or other purposes, the valve $U^3$ is closed, whereby the water-space of the jacket is separated from that of the core, the steam and the milk are shut off, and the milk in the heater is drained off through the gate $f$. The cover is then removed, the air-vent opened, and the core unscrewed. The water from the core now flows down through the milk-pipes and escapes through the gate $f$. In this way the water in the core is discharged, while the water in the jacket is retained in the apparatus. When the heater has been again assembled, the valve $U^3$ is opened. The water in the jacket now enters the core and distributes itself between the latter and the jacket. The water-spaces in the jacket and core are then replenished through the overflow-box. This construction is very simple and saves the hot water in the jacket when the core is removed.

When the apparatus is used for pasteurizing milk or other liquids, the spaces of the core and jacket are not supplied with water, but are heated merely by steam. In this case it is not absolutely necessary that the spaces of the jacket and core should communicate, as each space may be supplied with steam separately. The communication between the core and jacket is of importance mainly for equalizing the pressure and temperature in the core and jacket and for making a single overflow answer for both.

I claim as my invention—

1. The combination of a stationary closed vessel, a surrounding hollow jacket secured thereto, a hollow core detachably secured within said vessel and separated from the side walls thereof by an annular flow-space and from one end thereof by an outlet-chamber for the liquid to be treated extending across said vessel, an inlet-pipe for the liquid opening into the opposite end of said flow-space, a discharge-conduit for the liquid leading from said outlet-chamber, and means for supplying a heating or cooling medium to said jacket and core, substantially as set forth.

2. The combination of a stationary closed vessel, a surrounding hollow jacket secured thereto, a hollow core detachably secured within said vessel and separated from the side walls by an annular flow-space and from one end thereof by an outlet-chamber for the liquid to be treated extending across said vessel, said hollow core communicating with said hollow jacket, an inlet-pipe for the liquid opening into the end of said vessel opposite to that at which said outlet-chamber is located, a discharge-conduit leading from said outlet-chamber, and means for supplying a heating or cooling medium to said jacket and core, substantially as set forth.

3. The combination of a stationary vessel, a surrounding hollow jacket, a stationary hollow core detachably secured within said vessel and separated from the side walls thereof by a flow-space for the liquid to be treated and from one end thereof by an outlet-chamber, said end of said vessel having an opening for the insertion and removal of said core, a detachable cover for said opening, a conduit for the discharge of the liquid which has been treated leading from said outlet-chamber, and means for supplying a heating or cooling medium to said jacket and core, substantially as set forth.

4. The combination of a stationary closed vessel, a surrounding hollow jacket secured thereto, a chamber at one end of said vessel extending across said vessel and said jacket, a stationary hollow core arranged within said vessel and separated from the side walls thereof by a flow-space for the liquid to be treated and from one end thereof by an outlet-chamber, a detachable hollow connection by which said core is attached to said vessel and placed in communication with said first-mentioned chamber, a supply-pipe for the liquid to be treated opening into the flow-space adjacent to said first-mentioned chamber, an outlet for the liquid which has been treated, and means for supplying a heating or cooling medium to said jacket or core, substantially as set forth.

5. The combination of a stationary closed vessel, a hollow surrounding jacket secured to the same, an end chamber which communicates with said jacket and extends across one end of said vessel, a stationary hollow core arranged within said vessel and separated from the side walls thereof by a flow-space for the liquid to be treated and from the other end of said vessel by an outlet-chamber, a detachable hollow connection by which said core is attached to said vessel and placed in communication with said end chamber, a supply-pipe for the liquid to be treated extending through said end chamber and opening into the flow-space adjacent thereto, an outlet for the liquid which has been treated, and means for supplying a heating or cooling medium to said jacket and core, substantially as set forth.

6. The combination of a stationary vessel, a hollow surrounding jacket secured to the same, an end chamber between one end of the jacket and the adjacent end of the vessel, a stationary hollow core arranged within said vessel and separated therefrom by a flow-space for the liquid to be treated, a detachable hollow connection by which said core is attached to said vessel and placed in communication with said chamber, a supply-pipe for the liquid to be treated opening into the flow-space adjacent to said end chamber, an outlet-chamber, an outlet-conduit for the liquid which has been treated communicating with said outlet-chamber, said vessel having at its end adjacent to said outlet-chamber an opening for inserting and removing the core, and a detachable cover for closing said opening, substantially as set forth.

7. The combination of a stationary vessel, a surrounding hollow jacket secured thereto, a bottom chamber between said jacket and said vessel, a hollow core arranged within said vessel and separated therefrom by a flow-space for the liquid to be treated, a detachable, hollow connection by which said core is attached to the bottom of said vessel and placed in communication with said chamber, a supply-pipe for the liquid to be treated arranged below the bottom of said vessel and opening into said flow-space at the lower end thereof, and an outlet-chamber at the upper end of said flow-place, substantially as set forth.

8. The combination of a stationary vessel, a surrounding hollow jacket secured thereto, a bottom chamber between said jacket and said vessel, a hollow core arranged within said vessel and separated therefrom by a flow-space for the liquid to be treated, a detachable hollow connection by which said core is attached to the bottom of said vessel and placed in communication with said bottom chamber, a supply-pipe for the liquid to be treated arranged below the bottom of said vessel and opening into said flow-space at the lower end thereof, and a drain device arranged in said liquid-supply pipe through which the contents of the vessel and core drain off upon disconnecting said core, substantially as set forth.

9. The combination of a stationary vessel, a surrounding hollow jacket secured thereto, an end chamber between the same and said vessel, a stationary hollow core arranged within said vessel and separated therefrom by a flow-space for the liquid to be treated, a detachable tubular connection between said vessel and said core, which establishes communication between the chamber and the core, a supply-pipe for the liquid to be treated discharging into said flow-space, and a supply-pipe for the heating medium discharging into said chamber in line with said tubular connection, substantially as set forth.

10. The combination of a stationary vessel, a surrounding hollow jacket secured thereto, an end chamber between the same and said vessel, a hollow core arranged within said vessel and separated therefrom by a flow-space for the liquid to be treated, a detachable tubular connection between said vessel and said core which establishes communication between the end chamber and the core, a supply-pipe for the liquid to be treated discharging into said flow-space, and a supply-pipe for the heating medium having branches discharging into said end chamber in line with said tubular connection and in line with said jacket, substantially as set forth.

11. The combination of a stationary vessel, a surrounding hollow jacket secured thereto, a bottom chamber between the same and said vessel, a stationary hollow core arranged within said vessel and separated from the side walls thereof by a flow-space for the liquid to be treated and from the upper end thereof by an outlet-chamber, a detachable, hollow connection by which said core is attached to the bottom of said vessel and placed in communication with said bottom chamber, a supply-pipe for the liquid to be treated opening into said flow-space at the lower end thereof, means for supplying a heating or cooling medium to said jacket and core, and an overflow-box arranged on the outer side of said vessel and communicating with the top of said jacket, substantially as set forth.

12. The combination of a stationary vessel, a surrounding hollow jacket secured thereto, a bottom chamber between said jacket and said vessel, a hollow core arranged within said vessel and separated from the side walls thereof by a flow-space for the liquid to be treated and from the upper end thereof by an outlet-chamber, a detachable hollow connection by which said core is attached to the bottom of said vessel and placed in communication with said bottom chamber, a supply-pipe for the liquid to be treated arranged below the bottom of said vessel and opening into said flow-space at the lower end thereof, and a vent-cock applied to the top of said core, substantially as set forth.

Witness my hand this 11th day of March, 1901.

HARVEY FELDMEIER.

Witnesses:
GRIFFITH PRICHARD,
JESSIE E. MERCHANT.